March 12, 1968   H. B. ROSENBERG   3,373,335
STACKED ASSEMBLY OF RECTIFIER UNITS INCORPORATING
SHUNT CAPACITORS
Filed Dec. 22, 1964
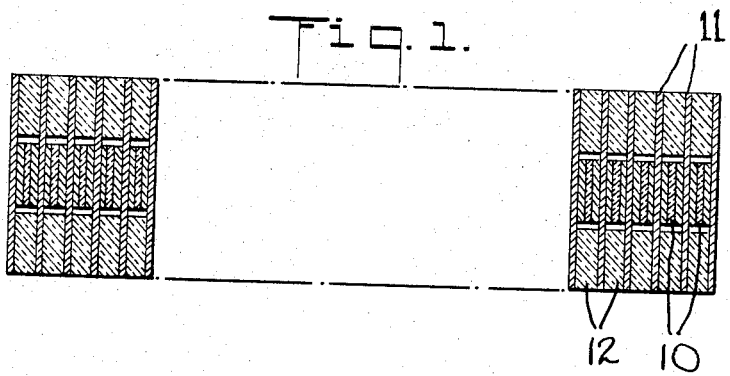
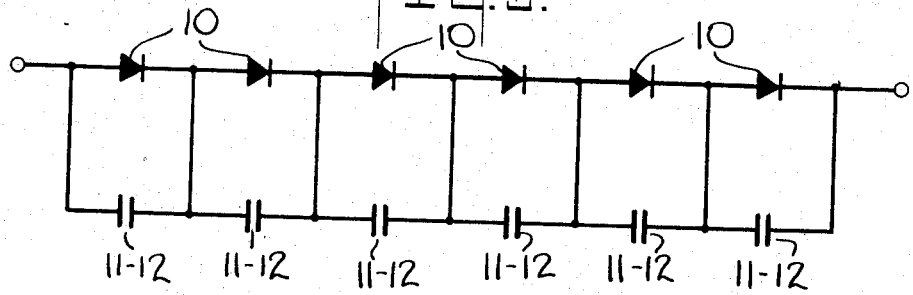
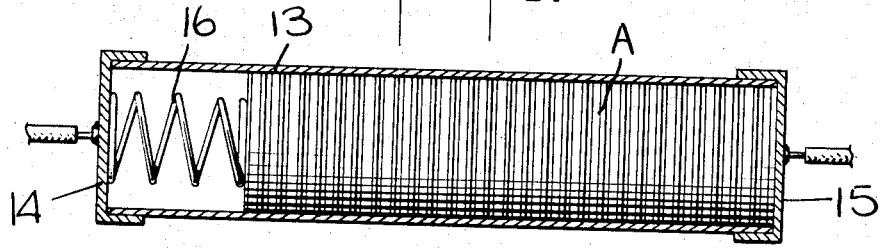
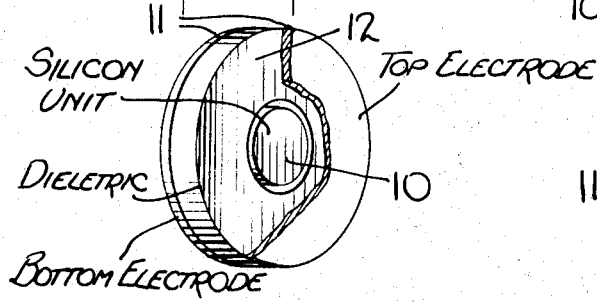
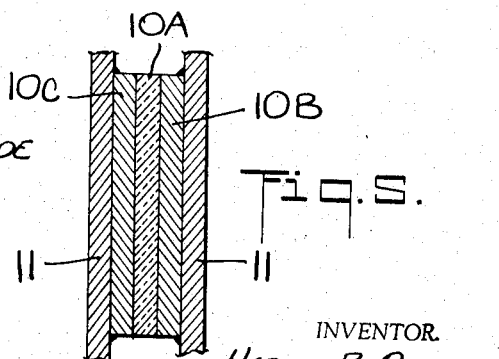
INVENTOR.
HAROLD B. ROSENBERG
BY
ATTORNEY

United States Patent Office 3,373,335
Patented Mar. 12, 1968

3,373,335
STACKED ASSEMBLY OF RECTIFIER UNITS
INCORPORATING SHUNT CAPACITORS
Harold B. Rosenberg, New Rochelle, N.Y., assignor to Electronic Devices, Inc., Yonkers, N.Y., a corporation of Delaware
Filed Dec. 22, 1964, Ser. No. 420,341
1 Claim. (Cl. 321—11)

ABSTRACT OF THE DISCLOSURE

An integrated assembly of rectifier units and protective shunt capacitors wherein a row of such units has electrodes interposed therebetween to connect the units in series, the electrodes having larger dimensions than said units to define an annular area which surrounds each unit, this area being occupied by an annular dielectric body which forms with the adjacent electrodes a capacitor in shunt relation with the unit and having a value acting to protect the unit from voltage surges.

This invention relates generally to series-connected rectifiers, and more particularly to a stacked assembly of series-connected silicon elements, which incorporates shunt capacitors across each element.

Silicon rectifiers with their very low reverse leakage current and high operating temperatures, appear to be displacing other types, particularly for power applications. While a germanium unit has a low forward voltage drop and hence is more efficient, these advantages are offset by the need to maintain the operating temperature below about 85° C. The silicon rectifier on the other hand, can be operated to almost 200° C. with much higher blocking voltages.

To withstand greater voltages, silicon rectifier units can be connected into a series assembly, and two or more series assemblies can be connected in parallel to handle more current, but there are problems of unbalance created by such arrangements. During the application of the voltage half wave producing conduction in the rectifiers, since the rectifier resistance is then quite low, most of the voltage is applied across the load, and there is no problem regarding voltage distribution. However, during the reverse half of the wave, differences in the internal resistance of the several units will produce an unequal distribution of voltages across each individual rectifier, which may have destructive effects. This imbalance is even more serious with respect to transient voltages resulting from switching and other operations giving rise to high voltage surges.

To provide a proper division of voltage and current across the series assembly of rectifier units, it is known to shunt each unit with a resistance-capacitance network. One may dispense with the resistors if the units are chosen so that they are fairly well matched as to their internal resistance. But to prevent failure of the units when subjected to certain transients, it is essential that a capacitor be shunted across each unit.

While silicon rectifiers may be connected in series by stacking them within a cartridge to provide a highly compact structure, it has heretofore not been possible to so stack the units when each unit must be shunted by a capacitor. Thus the conventional arrangement is relatively cumbersome in that it is constituted by a string of series-connected silicon units in conjunction with a string of capacitors shunted across the rectifier string.

Accordingly, it is the main object of this invention to provide an assembly of series-connected silicon units, each unit having a capacitor integrated therewith, whereby external protective capacitors are not required and the assembly may therefore be stacked in a cartridge.

For a better understanding of the invention, as well as other objects and further features thereof, reference is made to the following detailed description to be read in conjunction with the accompanying drawing, wherein:

FIG. 1 is a sectional view of an integrated assembly of series-connected silicon rectifier units and shunt capacitors;

FIG. 2 is a perspective view of one integral unit with one electrode partially removed;

FIG. 3 schematically illustrates the circuit diagram of the assembly;

FIG. 4 is an elevational view of a cartridge containing the assembly, with the casing cut away; and FIG. 5 is an enlarged sectional view of a single silicon cell.

Referring now to FIGS. 1 and 2, there is shown an integrated assembly in accordance with the invention, which assembly is constituted by a series of silicon rectifier units 10, each unit being interposed between electrodes 11, and being surrounded by a dielectric material 12. The individual units, as best seen in FIG. 5, are constituted by a silicon cell 10A sandwiched between two metallic plates 10B and 10C, the plates being brazed to the electrodes 11. The sandwich is disc-shaped and is centered on disc-shaped electrodes, whereby the area surrounding the sandwich is of annular form.

The dielectric material interposed between the electrodes may be in the form of a ring of epoxy material, phenolic, ceramic, mica or oil having a dielectric constant such that the resultant capacitance produced by the combination of the electrodes 11 and the dielectric body 12 has a value of 100 to 1000 mmfd., suitable for protecting the associated silicon diode from voltage surges. The dielectric is preferably bonded to the surfaces of the electrodes thereby sealing in the diode and protecting it against dirt and moisture seepage.

The electrodes are preferably of a material such as copper, having a high electrical and thermal conductivity thereby dissipating heat as well as providing the requisite electrical properties.

The equivalent electrical circuit is shown in FIG. 3, and it will be seen that the assembly is constituted by a row of diodes connected in series through the electrodes, each diode being shunted by a capacitor. The circuit is fully integrated in that the structure of the capacitors is combined with the diodes, thereby avoiding the need to connect the capacitors across the diodes.

Because of the integrated assembly, it becomes possible to house the structure within a cartridge, as shown in FIG. 4, wherein the assembly A of diodes and capacitors is enclosed in an insulating casing 13 enclosed by metallic end caps 14 and 15. Contact to the end caps is assured by means of a helical spring 16 placed between end cap 14 and the assembly, and serving to urge the assembly against the end cap 15. Leads 17 and 18 are soldered to the end caps to facilitate circuit connections. The caps may also be designed to be received within spring fingers on a mounting strip, whereby cartridges may be plugged in and removed readily from the circuit.

While there has been shown and described a preferred embodiment of silicon rectifier cartridge in accordance with the invention, it will be appreciated that many changes and modifications may be made therein without, however, departing from the essential spirit of the invention as defined in the annexed claims.

What I claim is:
1. An integrated assembly of rectifier units and protective shunt capacitors for use in rectifying an alternating wave in a circuit subject to transient voltage surges, comprising:
- (a) a row of disc-shaped rectifier units each constituted by a silicon diode formed by a silicon cell sandwiched between a pair of plates, each unit in the row having substantially the same internal resistance characteristic,
- (b) disc-shaped copper electrodes of high thermal conductivity interposed between said units and brazed to the plates thereof to connect said units in series, the diameter of said electrodes exceeding that of said units, each unit being centered between a pair of said electrodes whereby it is surrounded by an annular area, and
- (c) an annular dielectric body formed of epoxy disposed in said annular areas between said pairs of electrodes and bonded thereto to form therewith solely a capacitor in shunt relation with said unit having a capacitative value in the range of about 100 to 1000 mmfd. acting to protect the associated unit from voltage surges, said units of substantially the same internal resistance acting to produce a substantially equal distribution of voltage across the individual units during the reverse half of said wave to prevent breakdown thereof.

References Cited

UNITED STATES PATENTS

| | | | |
|---|---|---|---|
| 2,918,612 | 12/1959 | Parrish | 317—234 |
| 2,922,091 | 1/1960 | Parrish et al. | 317—234 |
| 3,234,437 | 2/1966 | Dumas | 317—234 |
| 3,264,531 | 8/1966 | Dickson | 317—234 |
| 3,319,136 | 5/1967 | Perry et al. | |

JOHN F. COUCH, *Primary Examiner.*

W. H. BEHA, *Assistant Examiner.*